US009889856B1

(12) United States Patent
Zhang

(10) Patent No.: US 9,889,856 B1
(45) Date of Patent: Feb. 13, 2018

(54) METHOD AND APPARATUS FOR CONTROLLING UNMANNED VEHICLE

(71) Applicant: BEIJING BAIDU NETCOM SCIENCE AND TECHNOLOGY CO., LTD., Beijing (CN)

(72) Inventor: Zhao Zhang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/429,334

(22) Filed: Feb. 10, 2017

(30) Foreign Application Priority Data

Aug. 9, 2016 (CN) .......................... 2016 1 0647814

(51) Int. Cl.
*B60W 40/08* (2012.01)
*G05D 1/02* (2006.01)
*G05D 1/00* (2006.01)
*G06K 9/00* (2006.01)

(52) U.S. Cl.
CPC ........... *B60W 40/08* (2013.01); *G05D 1/0088* (2013.01); *G05D 1/0214* (2013.01); *G06K 9/00845* (2013.01); *B60W 2400/00* (2013.01); *B60W 2420/42* (2013.01); *B60W 2540/22* (2013.01); *G05D 2201/0212* (2013.01)

(58) Field of Classification Search
CPC ............. B60W 40/08; B60W 2400/00; B60W 2420/42; B60W 2540/22; G05D 1/0214; G05D 1/0088; G05D 9/00845; G05D 2201/0212
See application file for complete search history.

(56) References Cited

U.S. PATENT DOCUMENTS

| | | | | |
|---|---|---|---|---|
| 5,155,684 A | * | 10/1992 | Burke | ................. G05D 1/0221 318/587 |
| 2012/0022719 A1 | * | 1/2012 | Matos | ................. B64C 39/024 701/2 |

* cited by examiner

*Primary Examiner* — Richard M Camby
(74) *Attorney, Agent, or Firm* — Lathrop Gage LLP

(57) ABSTRACT

The present application discloses a method and apparatus for controlling an unmanned vehicle. The method may comprise: collecting image information and vital sign information of a person in an unmanned vehicle, and origin information and destination information of the unmanned vehicle; generating action characteristic information of the person based on the image information; generating emotional characteristic information and physical state information of the person based on the action characteristic information and the vital sign information; determining a route and an operation mode of the unmanned vehicle based on the emotional characteristic information, the physical state information, the origin information and the destination information; and controlling the unmanned vehicle based on the determined route and operation mode. The implementation achieves automatic control of an unmanned vehicle based on the emotion and physical state of a person in the unmanned vehicle.

15 Claims, 6 Drawing Sheets

METHOD AND APPARATUS FOR CONTROLLING UNMANNED VEHICLE

CROSS-REFERENCE TO RELATED APPLICATION

This application is related to and claims priority from Chinese Application No. 201610647814.3, filed on Aug. 9, 2016 and entitled "method and apparatus for controlling unmanned vehicle", the entire disclosure of which is hereby incorporated by reference.

TECHNICAL FIELD

The present application relates to the field of vehicle technology, specifically to the field of unmanned vehicle technology, and more specifically to a method and apparatus for controlling an unmanned vehicle.

BACKGROUND

An unmanned vehicle is a smart vehicle. The unmanned vehicle is a combination product of most advanced scientific and technological achievements such as electronic computer with the contemporary automotive industry, and in general has automatic driving, automatic transmission and automatic road identification functions. A user may interact with an unmanned vehicle and set a travel route and an operation mode through a touch screen or voice.

However, the current process of interacting with the unmanned vehicle and setting the travel route and the operation mode through the touch screen or voice is relatively tedious. The unmanned vehicle cannot automatically adjust the route and operation mode based on the user's emotional and physical states.

SUMMARY

An objective of the present application is to provide a method and apparatus for controlling an unmanned vehicle, in order to solve the technical problem mentioned in the Background.

In a first aspect, the present application provides a method for controlling an unmanned vehicle, comprising: collecting image information and vital sign information of a person in an unmanned vehicle, and origin information and destination information of the unmanned vehicle; generating action characteristic information of the person based on the image information; generating emotional characteristic information and physical state information of the person based on the action characteristic information and the vital sign information; determining a route and an operation mode of the unmanned vehicle based on the emotional characteristic information, the physical state information, the origin information and the destination information; and controlling the unmanned vehicle based on the determined route and operation mode.

In some embodiments, the determining a route and an operation mode of the unmanned vehicle based on the emotional characteristic information, the physical state information, the origin information and the destination information comprises: retrieving at least one route based on the origin information and the destination information; determining a route for travelling by the unmanned vehicle from the at least one route based on the emotional characteristic information and the physical state information; and determining an operation mode of the unmanned vehicle based on the emotional characteristic information, the physical state information and the determined route.

In some embodiments, the controlling the unmanned vehicle based on the determined route and operation mode comprises: setting a parameter of the unmanned vehicle based on the operation mode, wherein the parameter includes at least one of the following: a radar monitoring frequency, a camera shooting angle, a power parameter, a speed parameter, an overtaking determining parameter, an audio and video type parameter, an audio and video volume parameter, an air conditioning setting parameter and a vehicle window opening and closing parameter.

In some embodiments, the collecting image information and vital sign information of a person in an unmanned vehicle, and origin information and destination information of the unmanned vehicle comprises: collecting periodically or in real time image information and vital sign information of the person, via a sensor mounted in the unmanned vehicle.

In some embodiments, the action characteristic information includes at least one of the following: expression characteristic information, head action characteristic information and body action characteristic information.

In a second aspect, the present application provides an apparatus for controlling an unmanned vehicle, comprising: a collection unit, configured to collect image information and vital sign information of a person in an unmanned vehicle, and origin information and destination information of the unmanned vehicle; a first generation unit, configured to generate action characteristic information of the person based on the image information; a second generation unit, configured to generate emotional characteristic information and physical state information of the person based on the action characteristic information and the vital sign information; a determination unit, configured to determine a route and an operation mode of the unmanned vehicle based on the emotional characteristic information, the physical state information, the origin information and the destination information; and a control unit, configured to control the unmanned vehicle based on the determined route and operation mode.

In some embodiments, the determination unit comprises: a retrieving module, configured to retrieve at least one route based on the origin information and the destination information; a route determination module, configured to determine a route for travelling by the unmanned vehicle from the at least one route based on the emotional characteristic information and the physical state information; and an operation mode determination module, configured to determine an operation mode of the unmanned vehicle based on the emotional characteristic information, the physical state information and the determined route.

In some embodiments, the control unit is further configured to: set a parameter of the unmanned vehicle based on the operation mode, wherein the parameter includes at least one of the following: a radar monitoring frequency, a camera shooting angle, a power parameter, a speed parameter, an overtaking determining parameter, an audio and video type parameter, an audio and video volume parameter, an air conditioning setting parameter and a vehicle window opening and closing parameter.

In some embodiments, the collection unit is further configured to: collect periodically or in real time image information and vital sign information of the person via a sensor mounted in the unmanned vehicle.

In some embodiments, the action characteristic information includes at least one of the following: expression characteristic information, head action characteristic information and body action characteristic information.

By collecting image information and vital sign information of a person in an unmanned vehicle, and origin information and destination information of the unmanned vehicle; generating action characteristic information of the person based on the image information; generating emotional characteristic information and physical state information of the person based on the action characteristic information and the vital sign information; determining a route and an operation mode of the unmanned vehicle based on the emotional characteristic information, the physical state information, the origin information and the destination information; and controlling the unmanned vehicle based on the determined route and operation mode, the method and apparatus for controlling an unmanned vehicle provided in the present application achieves automatic adaptive adjustment of the route and operation mode based on the user's emotion and physical state.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
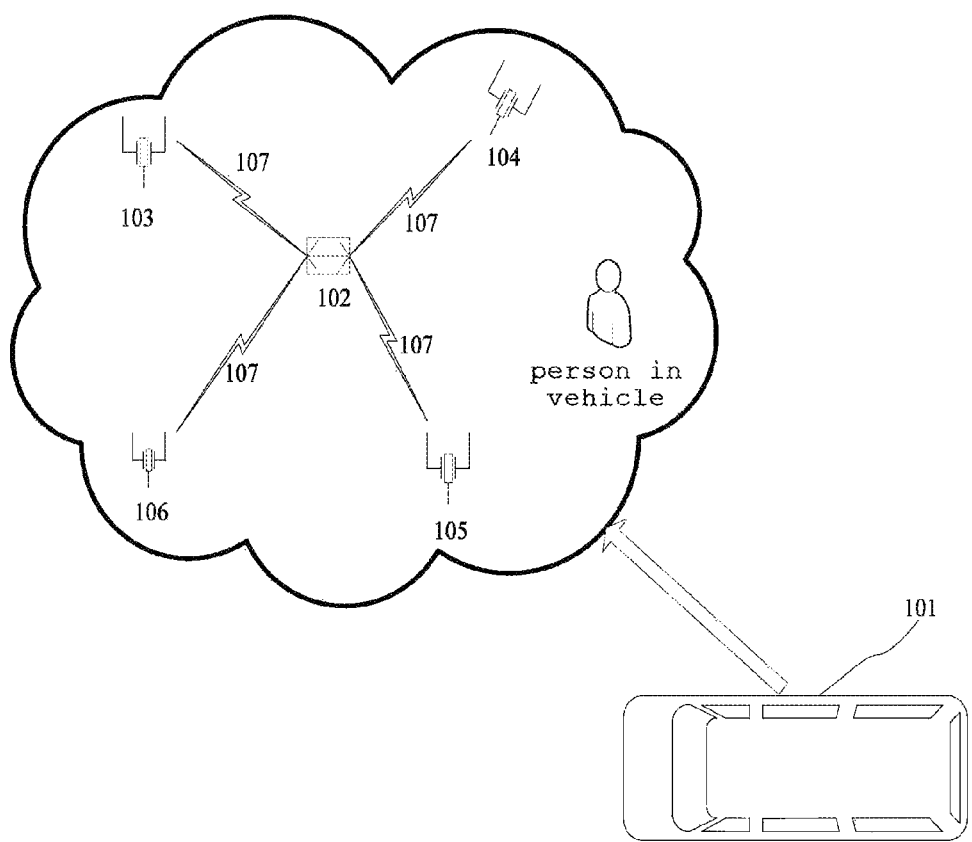
FIG. 1 is an architectural diagram of an exemplary system to which the present application may be applicable.

FIG. 1 shows an exemplary system architecture 100 to which an embodiment of a method or apparatus for controlling an unmanned vehicle according to the present application can be applicable.

As shown in FIG. 1, the system architecture 100 may include an unmanned vehicle 101, a vehicle terminal 102 mounted with an unmanned driving control system, sensors 103, 104, 105 and 106 and a communication link 107. The vehicle terminal 102 is mounted in the unmanned vehicle 101. The sensors 103, 104, 105 and 106 may be various types of sensors mounted in the unmanned vehicle 101. The communication link 107 is used for providing a communication medium between the sensors 103, 104, 105 and 106 and the vehicle terminal 102. The communication link 107 may include various types of connections, such as wired or wireless communication links.

The sensors 103, 104, 105 and 106 may collect image information and vital sign information of a person, and collect origin information and destination information of the unmanned vehicle 101. The vehicle terminal 102 may be a vehicle terminal providing various services. For example, the vehicle terminal 102 may receive image information, vital sign information, origin information and destination information transmitted by the sensor 103, 104, 105 and 106, and generate emotional characteristic information and physical state information of a person. In addition, the vehicle terminal 102 may determine a route and an operation mode, and send an instruction message to the sensors 103, 104, 105 and 106.

It should be noted that the method for controlling an unmanned vehicle according to an embodiment of the present application is generally executed by the vehicle terminal 102.

It should be appreciated that the numbers and positions of the vehicle terminals and the sensors in FIG. 1 are merely illustrative. Any number of vehicle terminals and sensors may be provided and mounted in any position, based on the requirements in practice.

Figure 2:
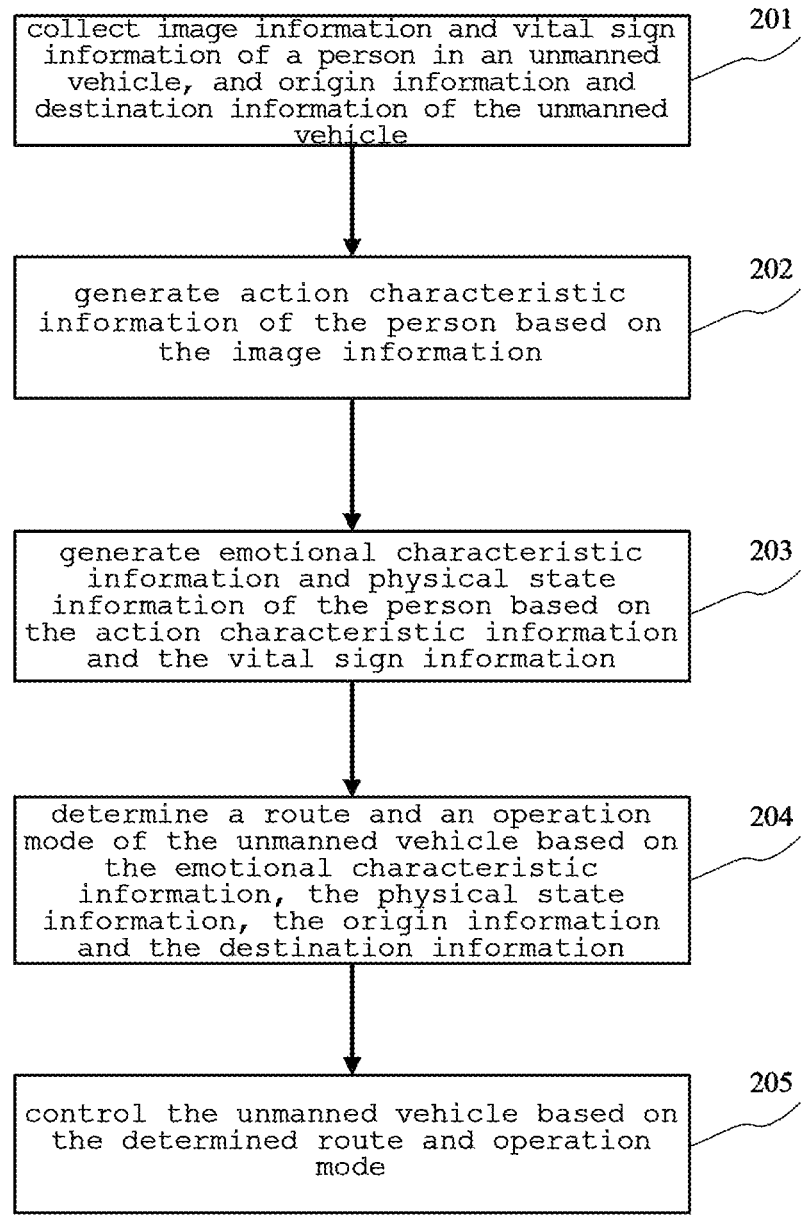
FIG. 2 is a flowchart of a method for controlling an unmanned vehicle according to an embodiment of the present application.

With further reference to FIG. 2, a flowchart 200 of the method for controlling an unmanned vehicle according to an embodiment of the present application is illustrated. The method for controlling an unmanned vehicle comprises the following steps.

Step 201, collect image information and vital sign information of a person in an unmanned vehicle, and origin information and destination information of the unmanned vehicle.

In this embodiment, an electronic device (e.g., the vehicle terminal 102 as illustrated in FIG. 1) on which the method for controlling an unmanned vehicle operate may collect image information of the person (e.g., 108 as illustrated in FIG. 1) in the unmanned vehicle, identify the image of the person in the image information, and determine size and location information of the person's image, via sensors (e.g., 103, 104, 105 and 106 as illustrated in FIG. 1) such as a camera and a thermal infrared imager mounted in the unmanned vehicle (e.g., 101 as illustrated in FIG. 1). Based on the size and location information of the person's image, the electronic device may adjust the angle, focus length and optical axis of the sensors, and trace and acquire image information with a high clarity. The image information may include but is not limited to at least one of the following: head image information and body image information. The image information may include but is not limited to static image and dynamic image sequence. The sensors may be mounted in areas corresponding to seats.

In this embodiment, the electronic device may use various types of navigation and positioning systems to locate current location information of the unmanned vehicle, and define the location information as origin information. The electronic device may interact with the person by using a touch screen or voicing to determine the origin information. The electronic device may interact with the person by using a touch screen or voicing to determine the destination information.

In this embodiment, the electronic device may collect vital sign information of the person via various types of sensors mounted in the unmanned vehicle. For example, the vital sign information may include but is not limited to at least one of the following: temperature information, heart rate information, respiration information and blood pressure information. The electronic device may measure a surface temperature and temperature distribution of a temperature field of the person via a non-contact thermometer. In addition, the electronic device may collect information such as the heart rate and blood oxygen saturation of the person by using a pulse sensor. Moreover, the electronic device may collect respiratory rate information via a membrane pressure sensor. Furthermore, the electronic device may collect blood pressure information of the person via an indirect blood pressure measuring instrument. The blood pressure information includes at least one of the following: systolic blood pressure and diastolic blood pressure.

In some alternative implementations of this embodiment, the electronic device collect periodically or in real time image information and vital sign information of the person, via various types of sensors mounted in the unmanned vehicle. For example, if the electronic device detects that the operation mode of the unmanned vehicle is off-road and the generated emotional characteristic information of the person is the emotional characteristic information indicating happy or fear, the electronic device collects in real time the image information and vital sign information of the person in a preset period. If the electronic device detects that the operation mode of the unmanned vehicle is a city mode or country mode, the generated emotional characteristic information of the person is the emotional characteristic information indicating happy, and the electronic device detects that the temperature value in the vital sign information of the person is within a normal range, the electronic device collects periodically the image information and vital sign information of the person according to a preset time interval.

Step 202, generate action characteristic information of the person based on the image information.

In this embodiment, based on the image information collected in step 201, the electronic device may adopt frequency feature extraction algorithm or depth learning algorithm to identify and extract the action characteristic information of the person in a static image and/or dynamic image sequence of the image information. The frequency feature extraction algorithm is an algorithm transforming an image from the spatial domain to the frequency domain and extracting the features. The depth learning algorithm is an artificial neural network containing multiple hidden layers. The depth learning algorithm forms abstract high-level features by combining low-level features.

In some alternative implementations of this embodiment, the electronic device may adopt the frequency feature extraction algorithm to identify and extract the action characteristic information of the person in the image information. The electronic device first performs Fourier transform on each row of pixels in the pixel matrix of an image, and then performs Fourier transform on each column of pixels in the pixel matrix of the image to obtain the frequency value of the image. In the image, the pixels of facial contours, head contours and limb contours of the person in the image correspond to a relatively high frequency value in the frequency domain. The frequency value is the action characteristic information.

In some alternative implementations of this embodiment, the electronic device may adopt the Convolutional Neural Network (CNN) of the depth learning algorithm to identify and extract the action characteristic information of the person from the image information. The CNN is a supervised depth learning algorithm. The CNN is similar to a biological neural network, wherein each neuron does not need to process the global image, but only to process a local image area. At a higher level, the processed local images are integrated to obtain the global information. The CNN may include an input layer, a convolution layer, a pooling layer, a fully-connected layer and an output layer. The electronic device has pre-trained every layer. The CNN may include multiple convolution layers and pooling layers. The CNN may identify and extract the action characteristic information of the person according to the following steps.

Firstly, the input layer preprocesses the image information. The input layer receives the input image information, denoises and normalizes the image information to obtain a numerical matrix, and transmits the numerical matrix to the next layer.

Secondly, the convolution layer and the pooling layer generate local characteristic information. The convolution layer processes data in steps as follow: the convolution layer firstly receives the numerical matrix transmitted from the input layer, divides the numerical matrix into 8×8 small matrices, then performs a convolution-calculation on each small matrix with a convolution kernel to obtain characteristic matrices, and lastly transmits the characteristic matrices to the pooling layer. The pooling layer processes data in steps as follow: the pooling layer firstly receives the characteristic matrices transmitted from the convolution layer, divides the characteristic matrices into 4×4 small matrices, then calculates the average value or maximum value of each small matrix to obtain pooling characteristic matrices, and lastly transmits the pooling characteristic matrices to the next layer. The pooling characteristic matrices are also known as local characteristic information.

Thirdly, the fully-connected layer generates the global characteristic information. Each node of the fully-connected layer is connected to each node of the previous layer. The fully-connected layer generates global characteristic information based on the received local characteristic information, and transmits the global characteristic information to the next layer.

Fourthly, the output layer receives the global characteristic information transmitted from the fully-connected layer, and classifies the global characteristic information to obtain the action characteristic information of the person.

Step 203, generate emotional characteristic information and physical state information of the person based on the action characteristic information and the vital sign information.

In this embodiment, based on the vital sign information collected in step 201 and the action characteristic information generated in step 202, the electronic device may adopt CNN of the depth learning algorithm or Deep Belief Network (DBN) to generate the emotional characteristic information and physical state information of the person. The emotional characteristic information may be used to indicate various kinds of emotions, including but not limited to any of the following: information indicating a normal emotion, information indicating a happy emotion, information indicating a surprised emotion, information indicating an angry emotion, information indicating a disgusted emotion, information indicating a scared emotion and information indicating a sad emotion. The physical state information may be the information for indicating the health level of the physical state. The physical state information may include but is not limited to one of the following: information indicating an excellent physical state, information indicating a good physical state and information indicating a poor physical state. If the emotion characteristic information of the person is required to be generated more accurately, information such as voicing, intonation and lip language of the person may be considered.

As a common sense, human emotion and physical state may be reflected through information such as expressions, head actions, body actions and vital signs. People in different emotional states make different actions. For example, when in a normal emotional state, one may be sitting relaxed in a chair; in a disgusted emotional state, one may be restless; in an angry emotional state, one may shake his fist; and in a sad emotional state, one may be head down. In different emotions, one's vital signs also vary. For example, body temperature may rise in a happy emotional state and breath may be fast in a sad emotional state. Moreover, emotional impact on one's blood pressure and heart rate is more obvious. In case of illness, one's vital signs may be out of the normal range, with a sad emotional state and less body actions. In a healthy case, one's vital signs are generally within the normal range, with a happy or normal emotional state and more body actions.

In some alternative implementations of this embodiment, the electronic device may adopt the CNN to generate the emotional characteristic information and physical state information by the following steps.

First, the electronic device uses the vital sign information and the action characteristic information as input parameters of the CNN. The CNN may include: an input layer, a convolution layer, a pooling layer, a fully-connected layer and an output layer. The electronic device has pre-trained each of the layers.

Secondly, the input layer compares the input vital sign information to the normal range of a corresponding vital sign, and preliminary determines the physical state information of the person.

Thirdly, the convolution layer and pooling layer generate the local characteristic information. The convolution layer conducts a convolution calculation on the vital sign information, the action characteristic information and the preliminary determined physical state information to obtain a numerical matrix. Then, the pooling layer adopts an aggregate statistical algorithm to reduce the scale of the data amount in the numerical matrix, and generates the local characteristic information. The aggregate statistical algorithm may be an algorithm calculating the average value or maximum value of local data in the numerical matrix.

Fourthly, the fully-connected layer processes the local characteristic information to generate the global characteristic information.

Fifthly, the output layer classifies the global characteristic information, and outputs the emotional characteristic information and physical state information of the person.

In some alternative implementations of this embodiment, the electronic device may adopt a DBN to generate the emotional characteristic information and physical state information. The DBN is a network trained with many samples having labels. The electronic device may select a label of the largest probability based on the action characteristic information, the vital sign information and the joint distribution of labels. The emotional characteristic information and physical state information corresponding to the label of the largest probability is the emotional characteristic information and physical state information of the person.

Step 204, determine a route and an operation mode of the unmanned vehicle based on the emotional characteristic information, the physical state information, the origin information and the destination information.

In this embodiment, the electronic device may use various navigation systems to retrieve feasible routes based on the origin information and the destination information. For each route in the feasible routes, route information of the route is further retrieved, wherein the route information may include at least one of the following: road surface information, distance information, congestion information, pre-estimated travel duration information, neighboring facility information and neighboring natural environment information. The neighboring facility information may be location information of gas stations, hotels and shops in the neighborhood of the route, and the neighboring natural environment information may be scenic spot information in the neighborhood of the route. The pre-estimated travel duration information may be duration information calculated by the electronic device based on the distance information, the congestion information and the feasible travel speed of the unmanned vehicle.

In this embodiment, based on the performance of the unmanned vehicle, the operation modes may include: a city mode, a country mode and an off-road mode. Based on the interior environment of the unmanned vehicle, the operation modes may include: a low-efficiency mode and a high-efficiency mode. In the low-efficiency mode, the played music may be in the type of country music, the air conditioner may be set to breeze and the skylight may be open. In the high-efficiency mode, the played music may be in the type of rock music or metal music, the music volume may be set over 50 decibel, the air conditioner may be set to moderate and the skylight may be open.

In some alternative implementations of this embodiment, the electronic device may adopt the CNN or DBN of the depth learning algorithm to determine a route and an operation mode for the unmanned vehicle based on the emotional characteristic information, the physical state information, the retrieved feasible routes and the route information of each route. For example, the electronic device may adopt the DBN to determine a route and an operation mode for the unmanned vehicle. The DBN is an unsupervised depth learning algorithm. The DBN is a network trained with many samples containing labels. The electronic device may select a label of the largest probability based on the emotional characteristic information, the physical state information, the route information and the joint distribution of labels. The route corresponding to the label of the largest probability may be used as the determined travel route of the unmanned vehicle, and the operation mode corresponding to the label of the largest probability may be used as the determined operation mode of the unmanned vehicle.

In some alternative implementations of this embodiment, the electronic device may determine a route and an operation mode for the unmanned vehicle based on preset provisions. For example, the electronic device may determine whether the location information of the unmanned vehicle is within a city, via a navigation and positioning system. If the location information of the unmanned vehicle is within a city, the electronic device selects a route of the shortest pre-estimated travel duration as the determined travel route of the unmanned vehicle and sets the operation mode to be the city mode, based on the pre-estimated travel durations of the retrieved feasible routes. In addition, the electronic device may further set the played music to the type of light music, set the music volume to less than 60 decibel, and set other parameters such as vehicle window off. If the location information of the unmanned vehicle is out of a city, the electronic device selects a route with the largest number of neighboring facilities as the determined travel route of the unmanned vehicle and sets the operation mode to be the country mode or off-road mode, based on the neighboring facility information of the retrieved feasible routes. In addition, the electronic device may further set the played music to the type of rock music, set the music volume to over 60 decibel, and set other parameters such as vehicle window open.

Step 205, control the unmanned vehicle based on the determined route and operation mode.

In this embodiment, the electronic device generates a corresponding instruction based on the route and the operation mode, and sends the instruction to a corresponding sensor or device. The sensor or device receives and executes the instruction. The instruction includes setting values of parameters of the unmanned vehicle. The parameters to be set may be performance parameters of the unmanned vehicle, such as a radar monitoring frequency and a speed parameter. The parameters to be set may also be the interior environment parameters of the unmanned vehicle, such as a type parameter of an automatically played audio and video, an air conditioning setting parameter and a height parameter of the seat in the unmanned vehicle. For example, in an operation mode of country mode, with road surface information of the route indicating an uneven road surface and multiple curves in the route, the electronic device sets the radar monitoring frequency to three times per second, the speed to 30 kilometers per hour, the camera shooting angle to 180 degrees and the audio and video volume to 50 decibel. The electronic device generates instructions to control the radar monitoring frequency, the travel speed, the camera shooting angle and the audio and video volume, and sends the instructions respectively to corresponding sensors and devices.

Figure 3:
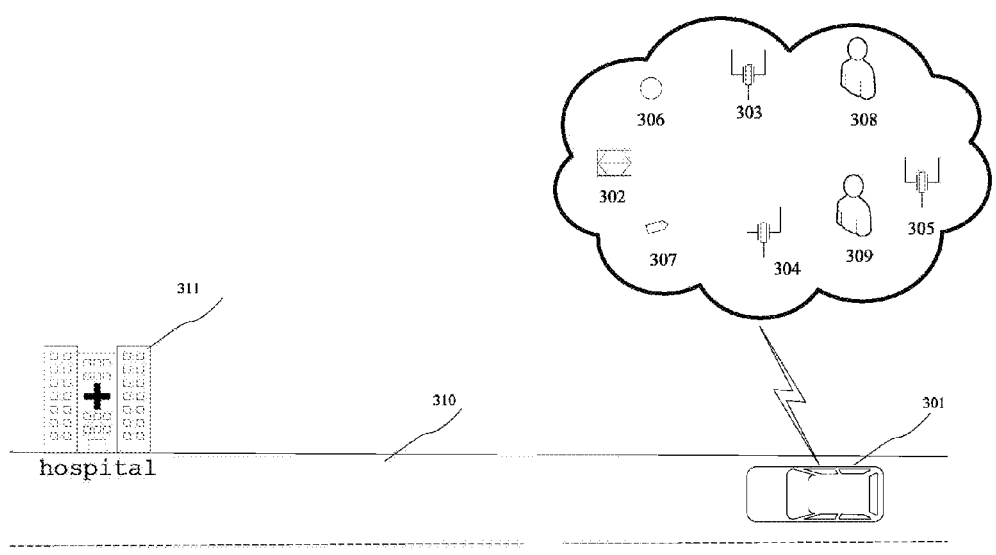
FIG. 3 is a schematic diagram of an application scenario of the method for controlling an unmanned vehicle according to the present application.

With further reference to FIG. 3 illustrating a schematic diagram of an application scenario of the method for controlling an unmanned vehicle according to the present embodiment. In the application scenario of FIG. 3, a vehicle terminal 302 mounted in an unmanned vehicle 301 locates the current location information as the origin information via a GPS (Global Positioning System) 306, interacts with the person 309 in the unmanned vehicle 301 via a speech sensor 307 to determine the destination information being the location information of a provincial hospital 311. Sensors 303, 304 and 305 collect the image information and vital sign information of the persons 308 and 309 in the unmanned vehicle 301, and transmit the image information and the vital sign information to the vehicle terminal 302 via a wireless connection. Based on the image information and the vital sign information, the vehicle terminal 302 analyzes and determines that the emotional characteristic information of the person 309 is indicating fear and the physical state information is indicating a good physical state, and that the emotional characteristic information of the person 308 is indicating sadness, with a face temperature higher than the normal range and the physical state information is indicating a poor physical state. Then, the vehicle terminal 302 retrieves all feasible routes and route information of each route in the feasible routes based on the origin information and the destination information. After that, the vehicle terminal 302 determines a route 310 of the shortest distance based on the emotional characteristic information and physical state information of the persons 308 and 309, and sets the operation mode of the unmanned vehicle 301 to be the city mode. The vehicle terminal 302 sets parameters of the unmanned vehicle 301 such as: set the radar monitoring frequency to six times per second, set the speed of the unmanned vehicle 301 to 40 kilometers per hour, set the camera shooting angle to 180 degrees, set the air conditioning to breeze, and set the overtaking determining parameter to yes.

Based on the collected image information and vital sign information of persons in an unmanned vehicle and the origin information and destination information of the unmanned vehicle, the method provided in the embodiment of the present application analyses and generates emotional information and physical state information of the persons, and then automatically sets the travel route and operation mode for the unmanned vehicle based on the emotional information and physical state information of the persons.

Figure 4:
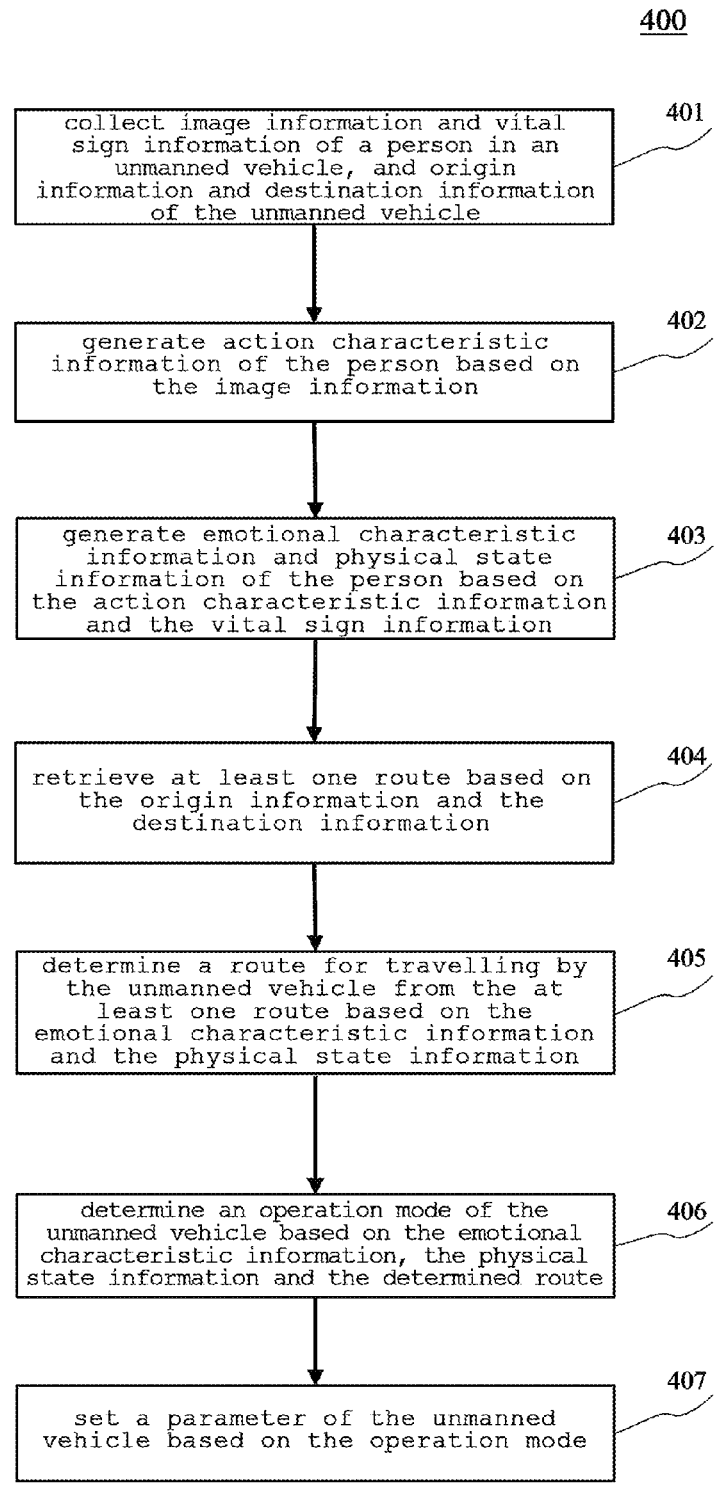
FIG. 4 is a flowchart of the method for controlling an unmanned vehicle according to another embodiment of the present application.

With further reference to FIG. 4, a flowchart 400 of the method for controlling an unmanned vehicle according to another embodiment is illustrated. The flowchart 400 of the method for controlling an unmanned vehicle comprises the following steps.

Step 401, collect image information and vital sign information of a person in an unmanned vehicle, and origin information and destination information of the unmanned vehicle.

In this embodiment, the electronic device (e.g., the vehicle terminal 102 as illustrated in FIG. 1) on which the method for controlling an unmanned vehicle operate collects image information and vital sign information of a person in an unmanned vehicle, and origin information and destination information of the unmanned vehicle as in step 201.

Step 402, generate action characteristic information of the person based on the image information.

In this embodiment, based on the collected image information in step 401, the electronic device may adopt an algorithm combining the frequency feature extraction algorithm and the DBN, to identify and extract action characteristic information from the image information. Firstly, the image information is denoised and normalized so as to generate a numerical matrix. Then, the numerical matrix is wavelet-transformed by adopting the frequency feature extraction algorithm to obtain frequency domain characteristic information. After that, the frequency domain characteristic information is input into the DBN The DBN is a network trained with many samples containing labels. Lastly, a label of the largest probability is selected based on the frequency domain characteristic information and the joint distribution of labels. The action characteristic information corresponding to the label of the largest probability may be used as the action characteristic information of the person.

Step 403: generate emotional characteristic information and physical state information of the person based on the action characteristic information and the vital sign information.

In this embodiment, the electronic device generates the emotional characteristic information and physical state information of the person based on the action characteristic information and the vital sign information as in step 203.

Step 404, retrieve at least one route based on the origin information and the destination information.

In this embodiment, the electric device retrieves at least one route via a GPS mounted in the unmanned vehicle. Each route is a feasible route retrieved via the GPS based on the origin information and destination information. For each route, the electronic device retrieves route information of the route. The route information may include but is not limited to at least one of the following: road surface information, distance information, congestion information, pre-estimated travel duration information, neighboring facility information and neighboring natural environment information.

Step 405: determine a route for travelling by the unmanned vehicle from the at least one route based on the emotional characteristic information and the physical state information.

In this embodiment, the electronic device may adopt various algorithms to determine a route for travelling by the unmanned vehicle from the at least one route based on the emotional characteristic information and the physical state information.

In some alternative implementations of this embodiment, the electronic device may determine a route for travelling by the unmanned vehicle based on a preset route determining rule. For example, if the emotional characteristic information is indicating disgusted emotion and the physical state information is indicating an excellent physical state, and the pre-estimated travel duration of each route exceeds 20 hours, a route with smooth road surface, gas stations and scenic spots in the neighborhood is selected.

In some alternative implementations of this embodiment, the electronic device may adopt the CNN or DBN to determine a route for travelling by the unmanned vehicle from the at least one route, based on the emotional characteristic information and the physical state information. For example, the DBN is a network trained with many samples containing labels. The electronic device may select a label of the largest probability based on the emotional characteristic information, the physical state information, the retrieved routes, the route information and the joint distribution of the labels. The route corresponding to the label of the largest probability may be used as the determined route for travelling by the unmanned vehicle.

Step 406, determine an operation mode of the unmanned vehicle based on the emotional characteristic information, the physical state information and the determined route.

In this embodiment, the electronic device may adopt various algorithms to determine the operation mode of the unmanned vehicle based on the emotional characteristic information, the physical state information and the determined route.

In some alternative implementations of this embodiment, the electronic device may determine an operation mode of the unmanned vehicle based on a preset operation mode determining rule. For example, if the emotion of the person in the unmanned vehicle is disgusted, the physical state information is excellent, the pre-estimated travel duration of the determined route is 21 hours and the neighboring facilities are few, the operation mode is set to be off-road based on performance parameters of the unmanned vehicle, and operation mode is also set to be in high efficiency based on interior environment parameters of the unmanned vehicle.

In some alternative implementations of this embodiment, the electronic device may adopt the CNN or DBN to determine an operation mode of the unmanned vehicle based on the emotional characteristic information, the physical state information and the determined route. For example, the electronic device adopts a convolutional neural algorithm to determine an operation mode of the unmanned vehicle with the following steps.

Firstly, the input layer normalizes the emotional characteristic information, the physical state information and the determined route information and obtains normalized data.

Secondly, the convolution layer conducts a convolution calculation on the normalized data and obtains a data matrix.

Thirdly, the pooling layer performs an aggregate statistical calculation to the data matrix and obtains local characteristic information.

Fourthly, the fully-connected layer processes the local characteristic information and generates global characteristic information.

Fifthly, the output layer classifies the global characteristic information and determines an operation mode of the unmanned vehicle.

Step 407, set a parameter of the unmanned vehicle based on the operation mode.

In this embodiment, the electronic device may generate a corresponding instruction based on a preset value of a parameter in the operation mode, and send the instruction to a corresponding sensor or device. The sensor or device receives and executes the corresponding instruction. The parameter includes at least one of the following: a radar monitoring frequency, a camera shooting angle, a power parameter, a speed parameter, an overtaking determining parameter, an audio and video type parameter, an audio and video volume parameter, an air conditioning setting parameter and a vehicle window opening and closing parameter. For example, if the operation mode is off-road, the radar monitoring frequency is set to five times per second, the power parameter is set to gasoline and battery hybrid, the music type is set to rock, the volume is set to 70 decibel and the skylight is set to open.

As shown in FIG. 4, compared with the embodiment corresponding to FIG. 2, the flow 400 of the method for controlling an unmanned vehicle in the present embodiment highlights the following steps. One step is to determine a route of the unmanned vehicle based on the emotional characteristic information and physical state information of a person in the unmanned vehicle. The other step is to determine an operation mode based on the emotional characteristic information and physical state information of the person in the unmanned vehicle and the determined route. Accordingly, based on the emotional characteristic information and physical state information of a person in the unmanned vehicle, the solution described in the embodiment may determine a route and an operation mode more accurately, and therefore offer a preferable travel experience.

Figure 5:
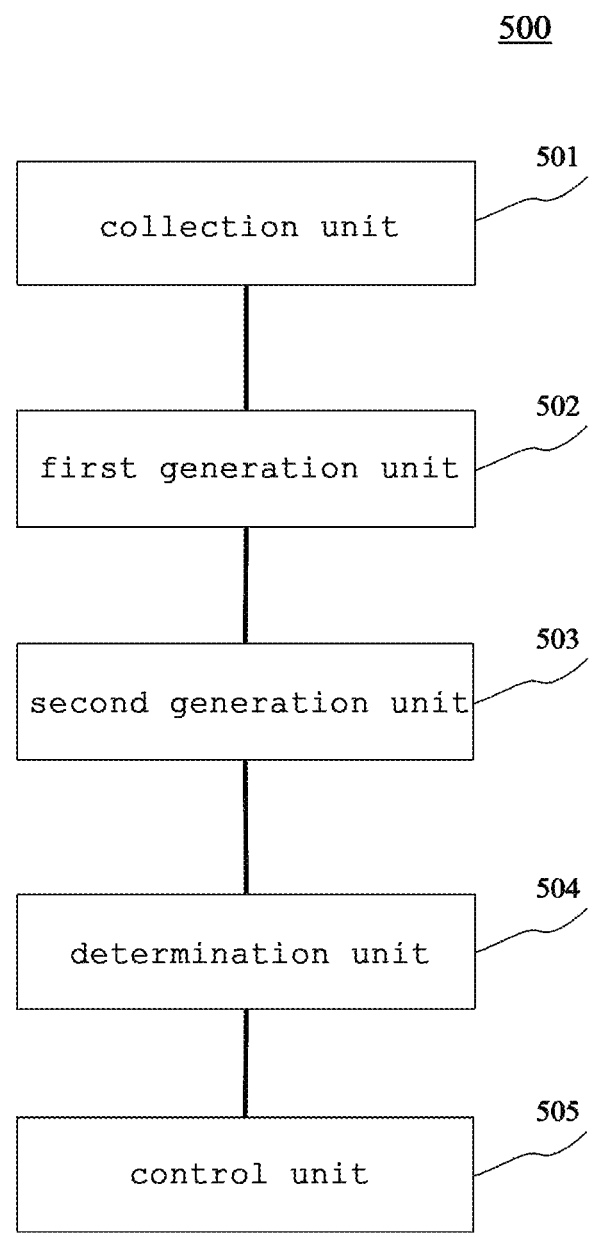
FIG. 5 is a schematic structural diagram of an apparatus for controlling an unmanned vehicle according to an embodiment of the present application.

With further reference to FIG. 5, as an implementation to the methods illustrated in the above figures, the present application provides an embodiment of an apparatus for controlling an unmanned vehicle. The apparatus embodiment corresponds to the method embodiment illustrated in FIG. 2, and is particularly applicable to various vehicle terminals.

As illustrated in FIG. 5, the apparatus 500 for controlling an unmanned vehicle of the present embodiment includes: a collection unit 501, a first generation unit 502, a second generation unit 503, a determination unit 504 and a control unit 505. The collection unit 501 is configured to collect image information and vital sign information of a person in an unmanned vehicle, and origin information and destination information of the unmanned vehicle. The first generation unit 502 is configured to generate action characteristic information of the person based on the image information. The second generation unit 503 is configured to generate emotional characteristic information and physical state information of the person based on the action characteristic information and the vital sign information. The determination unit 504 is configured to determine a route and an operation mode of the unmanned vehicle based on the emotional characteristic information, the physical state information, the origin information and the destination information. The control unit 505 is configured to control the unmanned vehicle based on the determined route and operation mode.

In this embodiment, the collection unit of the apparatus 500 for controlling an unmanned vehicle may collect the image information of the person in the unmanned vehicle via sensors mounted in the unmanned vehicle, such as a camera or a thermal infrared imager. The collection unit may use a GPS to locate the current location information of the unmanned vehicle, and define the location information as the origin information. The collection unit may interact with the person by voicing to determine the destination information. The collection unit may collect the vital sign information of the person via various types of sensors mounted in the unmanned vehicle. The vital sign information may include but is not limited to at least one of the following: temperature information, heart rate information, respiration information and blood pressure information.

In this embodiment, the first generation unit 502 may adopt a frequency feature extraction algorithm or depth learning algorithm to identify and extract action characteristic information of a static image and/or dynamic image sequence of the image information.

In this embodiment, the second generation unit 503 may adopt the CNN or DBN of deep learning to generate the emotional characteristic information and physical state information of the person based on the vital sign information collected in the collection unit 501 and the action characteristic information generated in the first generation unit 502.

In this embodiment, firstly, the determination unit 504 retrieves feasible routes based on the origin information and destination information via various navigation systems. For each of the feasible routes, the electronic device retrieves route information of the route. Then, the determination unit 504 may adopt the DBN or a preset rule to determine a route and an operation mode of the unmanned vehicle based on the emotional characteristic information, the physical state information, the retrieved feasible routes and the route information of each route.

In this embodiment, the control unit 505 generates a corresponding instruction based on the determined route and the operation mode and sends the instruction to a corresponding sensor or device. The sensor or device receives and executes the corresponding instruction.

In some alternative implementations of this embodiment, the determination unit 504 comprises: a retrieving module, configured to retrieve at least one route based on the origin information and the destination information; a route determination module, configured to determine a route for travelling by the unmanned vehicle from the at least one route based on the emotional characteristic information and the physical state information; and an operation mode determination module, configured to determine an operation mode of the unmanned vehicle based on the emotional characteristic information, the physical state information and the determined route.

In some alternative implementations of this embodiment, the control unit 505 is further configured to: set a parameter of the unmanned vehicle based on the operation mode, wherein the parameter includes at least one of the following: a radar monitoring frequency, a camera shooting angle, a power parameter, a speed parameter, an overtaking determining parameter, an audio and video type parameter, an audio and video volume parameter, an air conditioning setting parameter and a vehicle window opening and closing parameter.

In some alternative implementations of this embodiment, the collection unit 501 is further configured to: collect periodically or in real time image information and vital sign information of the person via a sensor mounted in the unmanned vehicle.

In some alternative implementations of this embodiment, the action characteristic information may include but is not limited to at least one of the following: expression characteristic information, head action characteristic information and body action characteristic information.

By collecting image information and vital sign information of a person in the unmanned vehicle and origin information and destination of the unmanned vehicle, the apparatus provided in the embodiment of the present application analyses and generates emotional information and physical state information of the person and automatically sets a travel route and an operation mode of the unmanned vehicle.

Figure 6:
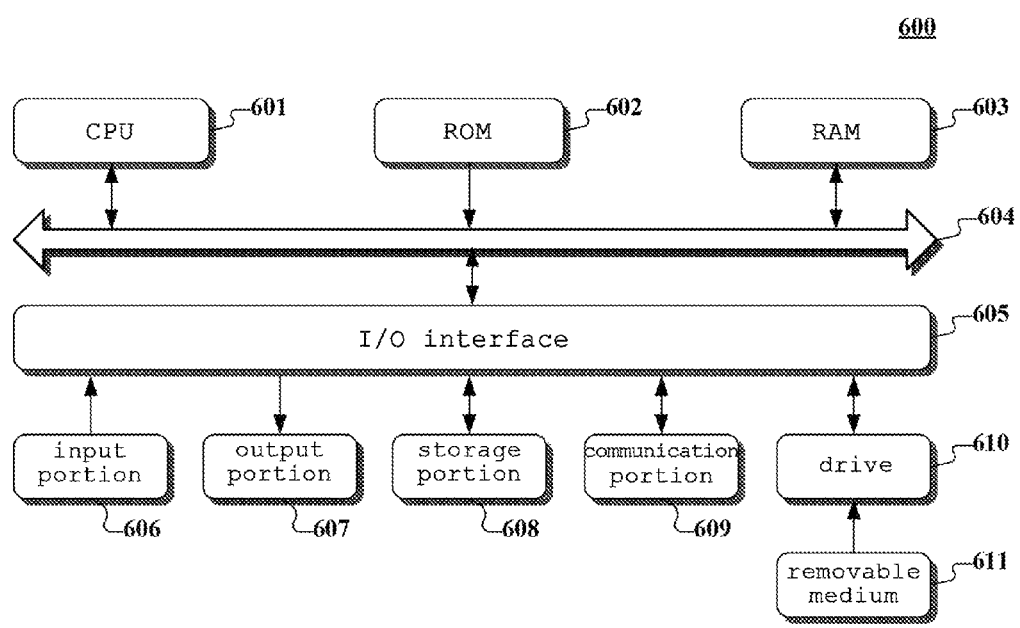
FIG. 6 is a schematic structural diagram of a computer system adapted to implement a vehicle terminal of the embodiments of the present application.

Referring to FIG. 6, a schematic structural diagram of a computer system 600 adapted to implement a vehicle terminal of the embodiments of the present application is shown.

As shown in FIG. 6, the computer system X00 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a collection unit, a first generation unit, a second generation unit, a determination unit and a control unit, where the names of these units or modules are not considered as a limitation to the units or modules. For example, the collection unit may also be described as "a unit for collecting image information and vital sign information of a person in an unmanned vehicle, and origin information and destination information of the unmanned vehicle".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: collect image information and vital sign information of a person in an unmanned vehicle, and origin information and destination information of the unmanned vehicle; generate action characteristic information of the person based on the image information; generate emotional characteristic information and physical state information of the person based on the action characteristic information and the vital sign information; determine a route and an operation mode of the unmanned vehicle based on the emotional characteristic information, the physical state information, the origin information and the destination information; and control the unmanned vehicle based on the determined route and operation mode.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for controlling an unmanned vehicle, comprising:
    collecting image information and vital sign information of a person in an unmanned vehicle, and origin information and destination information of the unmanned vehicle;
    generating action characteristic information of the person based on the image information;
    generating emotional characteristic information and physical state information of the person based on the action characteristic information and the vital sign information;
    determining a route and an operation mode of the unmanned vehicle based on the emotional characteristic information, the physical state information, the origin information and the destination information; and
    controlling the unmanned vehicle based on the determined route and operation mode.

2. The method for controlling an unmanned vehicle according to claim 1, wherein the determining a route and an operation mode of the unmanned vehicle based on the emotional characteristic information, the physical state information, the origin information and the destination information comprises:
    retrieving at least one route based on the origin information and the destination information;
    determining a route for travelling by the unmanned vehicle from the at least one route based on the emotional characteristic information and the physical state information; and
    determining an operation mode of the unmanned vehicle based on the emotional characteristic information, the physical state information and the determined route.

3. The method for controlling an unmanned vehicle according to claim 1, wherein the controlling the unmanned vehicle based on the determined route and operation mode comprises:
    setting a parameter of the unmanned vehicle based on the operation mode, wherein the parameter includes at least one of the following: a radar monitoring frequency, a camera shooting angle, a power parameter, a speed parameter, an overtaking determining parameter, an audio and video type parameter, an audio and video volume parameter, an air conditioning setting parameter and a vehicle window opening and closing parameter.

4. The method for controlling an unmanned vehicle according to claim 1, wherein the collecting image information and vital sign information of a person in an unmanned vehicle, and origin information and destination information of the unmanned vehicle comprises:
    collecting periodically or in real time image information and vital sign information of the person, via a sensor mounted in the unmanned vehicle.

5. The method for controlling an unmanned vehicle according to claim 1, wherein the action characteristic information includes at least one of the following: expression characteristic information, head action characteristic information and body action characteristic information.

6. An apparatus for controlling an unmanned vehicle, comprising:
    at least one processor; and
    a memory storing instructions, which when executed by the at least one processor, cause the at least one processor to perform operations, the operations comprising:
    collecting image information and vital sign information of a person in an unmanned vehicle, and origin information and destination information of the unmanned vehicle;
    generating action characteristic information of the person based on the image information;

generating emotional characteristic information and physical state information of the person based on the action characteristic information and the vital sign information;

determining a route and an operation mode of the unmanned vehicle based on the emotional characteristic information, the physical state information, the origin information and the destination information; and controlling the unmanned vehicle based on the determined route and operation mode.

7. The apparatus for controlling an unmanned vehicle according to claim 6, wherein the determining a route and an operation mode of the unmanned vehicle based on the emotional characteristic information, the physical state information, the origin information and the destination information comprises:

retrieving at least one route based on the origin information and the destination information;

determining a route for travelling by the unmanned vehicle from the at least one route based on the emotional characteristic information and the physical state information; and determining an operation mode of the unmanned vehicle based on the emotional characteristic information, the physical state information and the determined route.

8. The apparatus for controlling an unmanned vehicle according to claim 6, wherein the controlling the unmanned vehicle based on the determined route and operation mode comprises:

setting a parameter of the unmanned vehicle based on the operation mode, wherein the parameter includes at least one of the following: a radar monitoring frequency, a camera shooting angle, a power parameter, a speed parameter, an overtaking determining parameter, an audio and video type parameter, an audio and video volume parameter, an air conditioning setting parameter and a vehicle window opening and closing parameter.

9. The apparatus for controlling an unmanned vehicle according to claim 6, wherein the collecting image information and vital sign information of a person in an unmanned vehicle, and origin information and destination information of the unmanned vehicle comprises:

collecting periodically or in real time image information and vital sign information of the person via a sensor mounted in the unmanned vehicle.

10. The apparatus for controlling an unmanned vehicle according to claim 6, wherein the action characteristic information includes at least one of the following: expression characteristic information, head action characteristic information and body action characteristic information.

11. A non-transitory storage medium storing one or more programs, the one or more programs when executed by an apparatus, causing the apparatus to perform a method for controlling an unmanned vehicle, the method comprising:

collecting image information and vital sign information of a person in an unmanned vehicle, and origin information and destination information of the unmanned vehicle;

generating action characteristic information of the person based on the image information;

generating emotional characteristic information and physical state information of the person based on the action characteristic information and the vital sign information;

determining a route and an operation mode of the unmanned vehicle based on the emotional characteristic information, the physical state information, the origin information and the destination information; and controlling the unmanned vehicle based on the determined route and operation mode.

12. The non-transitory storage medium according to claim 11, wherein the determining a route and an operation mode of the unmanned vehicle based on the emotional characteristic information, the physical state information, the origin information and the destination information comprises:

retrieving at least one route based on the origin information and the destination information;

determining a route for travelling by the unmanned vehicle from the at least one route based on the emotional characteristic information and the physical state information; and determining an operation mode of the unmanned vehicle based on the emotional characteristic information, the physical state information and the determined route.

13. The non-transitory storage medium according to claim 11, wherein the controlling the unmanned vehicle based on the determined route and operation mode comprises:

setting a parameter of the unmanned vehicle based on the operation mode, wherein the parameter includes at least one of the following: a radar monitoring frequency, a camera shooting angle, a power parameter, a speed parameter, an overtaking determining parameter, an audio and video type parameter, an audio and video volume parameter, an air conditioning setting parameter and a vehicle window opening and closing parameter.

14. The non-transitory storage medium according to claim 11, wherein the collecting image information and vital sign information of a person in an unmanned vehicle, and origin information and destination information of the unmanned vehicle comprises:

collecting periodically or in real time image information and vital sign information of the person, via a sensor mounted in the unmanned vehicle.

15. The non-transitory storage medium according to claim 11, wherein the action characteristic information includes at least one of the following: expression characteristic information, head action characteristic information and body action characteristic information.

* * * * *